E. RINGSMITH.
WHEEL STRUCTURE.
APPLICATION FILED FEB. 9, 1916.
Patented Nov. 28, 1916.
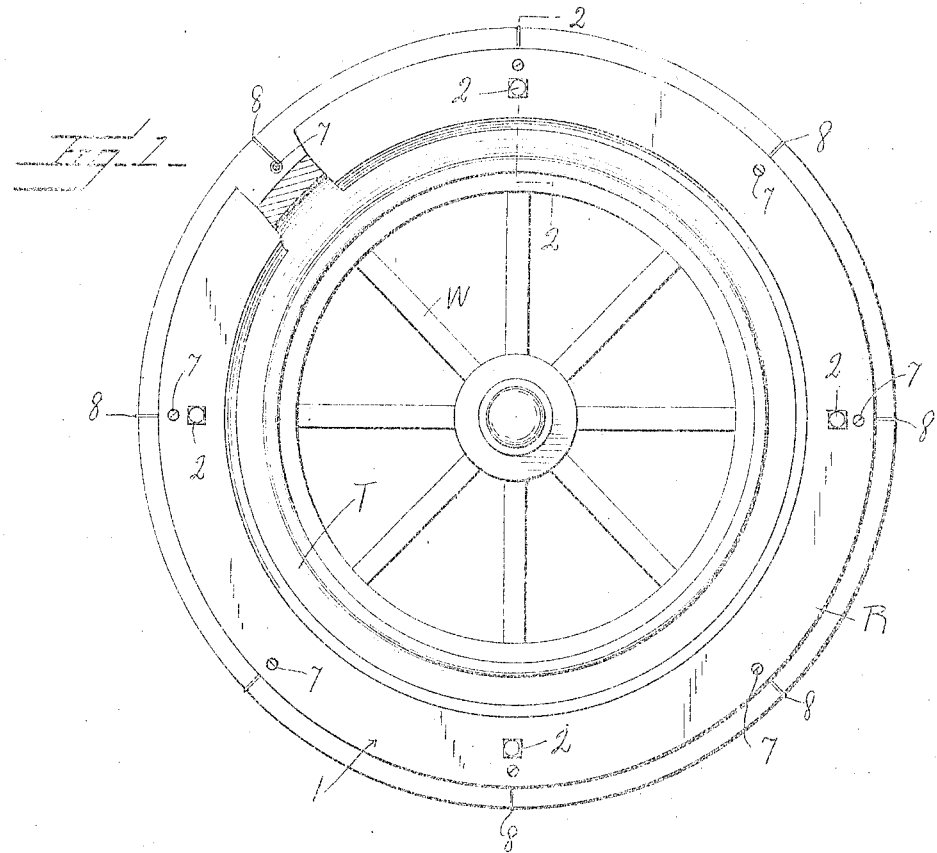
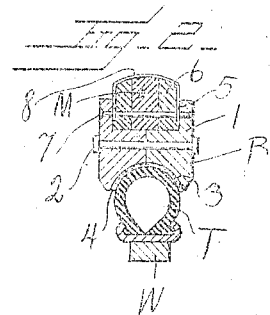
Inventor
E. RINGSMITH
Attorney

UNITED STATES PATENT OFFICE.

ELIJAH RINGSMITH, OF MORENCI, ARIZONA.

WHEEL STRUCTURE.

1,206,377.

Specification of Letters Patent. Patented Nov. 28, 1916.

Application filed February 9, 1916. Serial No. 77,282.

*To all whom it may concern:*

Be it known that I, ELIJAH RINGSMITH, a citizen of the United States, residing at Morenci, in the county of Greenlee and State of Arizona, have invented certain new and useful Improvements in Wheel Structures, of which the following is a specification, reference being had to the accompanying drawings.

This invention relates to certain improvements in wheel structures and it is an object of the invention to provide a device of this general character having novel and improved means whereby a supplemental rim or tread member may be readily and conveniently applied to a conventional wheel and wherein the tire carried by the wheel serves as a cushioning element.

Furthermore it is an object of the invention to provide a device of this general character including a novel and improved supplemental rim provided with means to prevent skidding.

The invention consists in the details of construction and in the combination and arrangement of the several parts of my improved wheel structure whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawing, wherein—

Figure 1 is a view in side elevation of a part broken away of a wheel constructed in accordance with an embodiment of my invention; Fig. 2 is a sectional view taken substantially on the line 2—2 of Fig. 1.

As set forth in Figs. 1 and 2, W denotes a wheel of conventional construction and including a pneumatic tire T and R denotes a supplemental rim constructed in accordance with an embodiment of my invention, said rim including duplicate annular members 1 maintained in assembled relation through the medium of the transverse bolts 2. The rim R is adapted to be applied in operative position upon the wheel W when the tire T is deflated, and the mean diameter of said rim R is such as to be effectively maintained in proper position upon inflation of the tire T. As is particularly shown in Fig. 2, the inner wall of the rim R is provided with the annular groove 3 to receive the tread portion of the tire T, and it is to be further observed that the groove 3 is provided with a lining 4 of asbestos, for a purpose which is believed to be self-evident.

The periphery of the rim R as disclosed in Fig. 1 is provided with the annular groove 5 in which the tread member M is inserted, and as herein disclosed, said tread member M provides a plurality of strips 6 of leather, rubber, or other material which can be employed with convenience and facility, and the same are held within the groove 5 through the medium of the transversely disposed bolts 7.

In order to provide further means to prevent slipping or skidding of the wheel, I find it of advantage to secure to each of the bolts 7 at opposite sides of the tread member M and within the groove 5 the extremities of a metallic strap 8 or the like, which is disposed transversely over the outer face of the tread member M, as is believed to be clearly shown in Figs. 1 and 2.

In Fig. 1, the members 6 are shown as continuous, although I have found in practice that the same can be employed with equal facility when each of the members 6 comprises a plurality of segmental sections. This, however, is thought to be an obvious expedient and one which does not need illustration.

It is to be observed that in addition to holding the tread member M within the groove 5 of the supplemental rim R and to afford an anchoring means for the extremities of the straps 8, the bolts 7 also afford an additional means for maintaining the duplicate annular members 1 comprised in said supplemental rim R in assembled relation.

From the foregoing description, it is thought to be obvious that a wheel structure constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

In combination with a wheel, a rim co-acting therewith and having its tread portion grooved, said rim comprising two duplicate annular members, means for holding the same in assembled relation, a tread member seated within the groove, bolts disposed through the rim and the tread member for holding the tread member in applied position and affording additional means for holding the annular members of the rim in assembled relation, and members disposed transversely of the tread member and overlying the same, the extremities of the members extending within the groove of the rim and secured to said bolts at opposite sides of the tread member.

In testimony whereof I hereunto affix my signature in the presence of two witnesses.

ELIJAH RINGSMITH.

Witnesses:
W. C. JACKSON,
O. P. ANDREWS.